March 7, 1939.  G. HUHN  2,149,524
PACKING FOR THE SHAFTS OF ROTARY MACHINES, TURBINES, AND THE LIKE
Filed Feb. 9, 1938
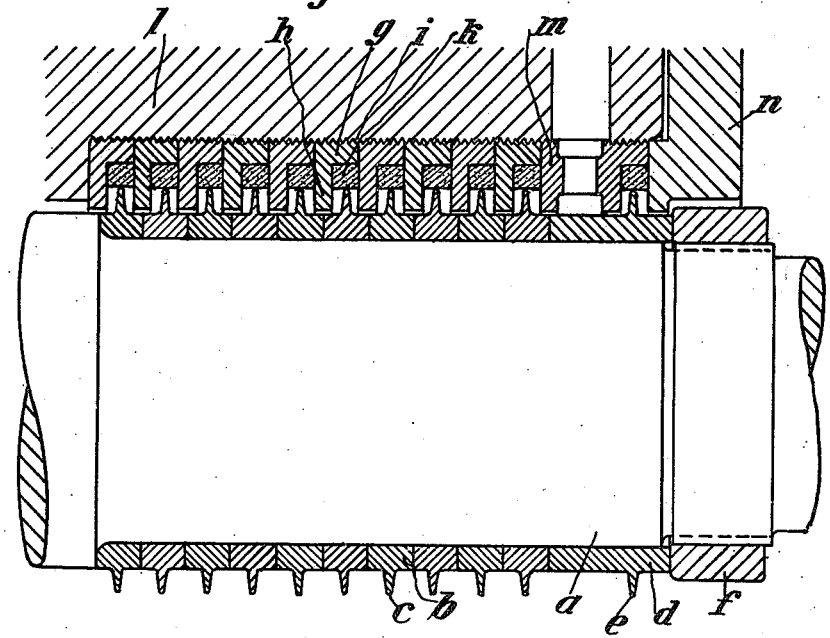
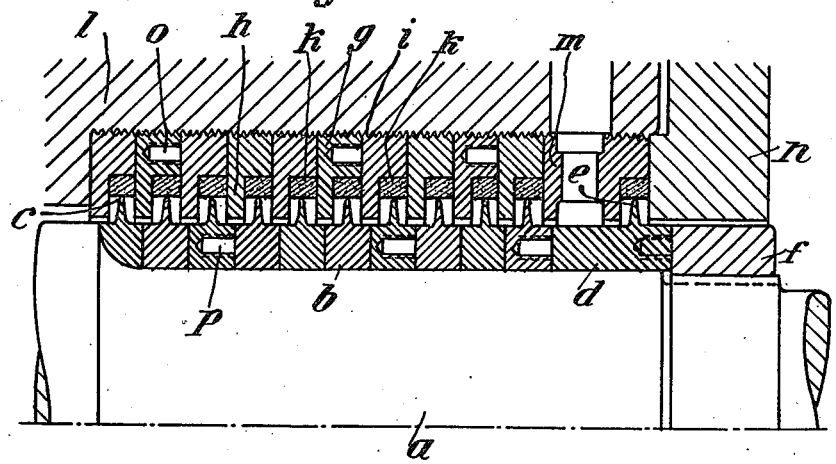
Inventor
Gustav Huhn
By H. B. Wilson & Co.
Attorneys Patented Mar. 7, 1939

2,149,524

UNITED STATES PATENT OFFICE 2,149,524

PACKING FOR THE SHAFTS OF ROTARY MACHINES, TURBINES, AND THE LIKE

Gustav Huhn, Berlin-Tempelhof, Germany

Application February 9, 1938, Serial No. 189,672
In Germany January 11, 1937

4 Claims. (Cl. 286—10)

This invention relates to a packing for the shafts of rotary machines, particularly for turbines, where it is necessary to pack against a driving fluid of high temperature and very high pressure. For the packing of such shafts graphite carbon rings are best suited, because the graphite carbon not only has a specially good gliding capacity on metal, but also because it remains unaltered even at the highest temperatures occurring. It, however, has the disadvantage of not following the expansions of the shaft during heating. It is for this reason that the graphite carbon rings hitherto used had to be formed of loosely associated segments, and these segments, when the shaft was at room temperature, required at their inner diameter next to the shaft, a clearance corresponding to the expansion to the diameter of the shaft at maximum temperature, to tightly surround the shaft after arriving at this state. This clearance was required in order that the segments could be inserted in place without any gaps being left at the joints. If the clearance between the inner face of the rings and the outer face of the shaft was not sufficient, the high pressures and temperatures involved and the great speed of rotation of the shaft in spite of the good gliding capacity of the graphite carbon caused such frictional temperatures that both the shaft and the graphite carbon were damaged thereby.

These inconveniences were especially great, when machines were to be operated at different times with alternating height of temperature and pressure and different speeds, as for instance marine turbines and particularly the turbines of men-of-war, where the number of rotations of the shaft, the temperature, and the pressure of the steam when cruising are much smaller than when forcedly running. If, for instance, such a shaft has a diameter of 200 millimeters and the maximum temperature to be reached is 400° C., for a steam temperature of 150° C. a clearance is left between the carbon packing rings and the shaft of half a millimeter. The quantity of steam escaping through such an opening, especially if the high temperature of this steam is taken into consideration, causes much trouble to the attendants in the engine rooms of the modern men-of-war, apart from the loss of water and fuel brought about thereby.

When labyrinth packing boxes are employed still more leakages appear than with the best known graphite carbon packings up to present. It must be added that the sheet strips used to form the labyrinth edges must consist of a stainless material, that is, of a material of another quality than that of the shaft. In consequence of the unequal coefficients of expansion of those sheets and of the shaft the clearance to be provided for on the labyrinths must be correspondingly greater, so that under no conditions can the labyrinth edges touch one another or too closely approach the shaft.

All these inconveniences are overcome by the present invention. According to this invention instead of the known graphite carbon rings formed from several segments, graphite carbon rings are used within highly expansible jackets of steel or other material shrunk thereon in such a manner that the carbon rings are forced to dilate or contract upon heating or cooling, respectively, corresponding to the expansion and contraction of the metal jackets. These jacketed graphite carbon rings are arranged, according to the present invention, with their free inner carbon surfaces opposite to sharpened or beveled annular ribs placed at regular intervals on the shaft, in a manner known in itself. To be sure that the graphite carbon rings may not glide in or fall out of their metal packets or armours even when the maximum operating temperature is reached, the temperature employed to expand the jackets when the carbon rings are to be inserted into said jackets, should be higher than the maximum operating temperature of the packing, and the outside diameter of the carbon rings which do not expand appreciably when heated must be so chosen that it will correspond exactly to the inner diameter of the expanded jackets when the latter are heated to said high temperature. For this purpose the jackets preferably are heated to glowing, and with the jackets at this temperature the carbon rings, the outside diameter of which corresponds to the inner diameter of the glowing metal rings, are inserted into them. Upon cooling the jackets contract around the carbon rings and the latter are very heavily compressed. Consequently these carbon rings by the shrinking of the steel jackets or rings obtain a much greater density and hardness than they would have otherwise. The inner diameter of these graphite carbon rings reduced also by the shrinking of the cooled jackets of steel or the like, is bored out to correspond to the outside diameter of the sharpened or beveled annular ribs to insure that a gliding fit will be provided between them, practically an unmeasurable clearance being preferably provided.

Since a graphite carbon ring jacketted in the indicated manner always follows the expansions and re-contractions resulting from the varying temperatures of the turbine shaft or of the annular steel ribs fixed on same and of the jackets of said carbon rings, the original gliding fit between said annular ribs and said carbon rings remains unaltered at any occurring temperatures and thus also the hardly measurable clearance between the annular ribs and the inner surfaces of the carbon rings is preserved. This is the case chiefly if the material of the jacketing rings has the same or nearly the same coefficient of heat expansion as has the material of the shaft or that of the annular ribs affixed to it. Preferably for these parts material of the same kind is used, such as steel.

When, in starting the turbine or the like, the steel shaft with its annular ribs expands upon heating, the metal jackets expand proportionately under the rising temperature and the graphite carbon rings expand under the influence of their compression. When the temperature falls and the diameter of the turbine shaft with its annular ribs decreases, the graphite carbon rings are again compressed and contracted by the action of the correspondingly shrinking steel jackets, in such a way that the inner diameter of the graphite carbon rings is reduced proportionally. Thus, by means of the steel jacket and its combination with the carbon ring, though the latter does not expand appreciably by heat, a carbon ring is obtained expanding by the action of the heat and shrinking again when cooled.

Preferably the metal jackets of the graphite carbon rings are provided on one edge with radial annular projections, which encircle the shaft. Therefore the jacketing rings have an L-shaped section. Labyrinths are formed by these radial projections of the jackets, preventing the steam from finding a straight path of escape even if some should escape through the hardly measurable gap between the graphite carbon rings and the shaft-carried ribs. Thus in a most simple way the packing consisting of the annular ribs and the jacketed carbon rings is combined with a labyrinth packing and it is made possible to considerably shorten the stuffing boxes, this being of great importance especially for the construction of steam turbines.

Whereas in the hitherto known stuffing boxes, having sharpened annular ribs working against suitably fixed carbon rings, the stuffing box casings must consist of two parts, this is unnecessary according to the present invention, as in this case the installation may be executed even when undivided casings are used. By these means a prior disadvantage of said known stuffing boxes, that they distort at the high temperature, is avoided, whereas undivided casings, especially cylindrical ones, expand uniformly. Thus much greater packing efficiency is obtained and a reduction in length of the stuffing box is made possible.

The drawing illustrates two embodiments of the invention, Figure 1 showing one embodiment in longitudinal section, wherein the lower part of the stuffing box and the jacketed carbon rings fixed in same are omitted, and Figure 2 showing a corresponding longitudinal section through a modification.

On the shaft $a$ (Fig. 1) rings $b$ are pushed with driving fit, each of said rings $b$ being provided with a sarpened annular rib $c$. The rearmost of these rings $b$ rests against a projecting collar of the shaft $a$. Before the first ring $d$, which is broader than the other rings $b$ and is provided with an annular rib $e$, a strong nut $f$ is screwed on the shaft $a$ so holding the rings $b$ and $d$ that they must rotate with the shaft $a$.

Within the casing of the stuffing box $l$ the jacketed graphite carbon rings are arranged opposite to the sharpened edges of the annular ribs $c$. These jacketed rings consist of the graphite carbon rings proper $k$ and the rings $g$ of steel or of other material with preferably the same coefficient of expansion by heat as the shaft $a$ and/or the rings $b$, $c$. The rings $g$ form the jackets for the rings $k$ and are provided with annular radial projections $h$, so that they possess an L-shaped section. The carbon rings $k$ are inserted into the jacketing rings $g$ previously heated to glowing, in the manner described above.

The jacketing rings $g$ are provided at their periphery with fine points or projections $i$, by means of which when adjusted they are pressed into the inner surface of the packing space of the part $l$. The inner edges of the projections $h$ of the L-shaped jacketing rings $g$ face and extend nearly to the periphery of the rings $b$.

The installation of the packing is performed in such a way that first an undivided jacketed carbon ring $g$, $h$, $k$ is pushed into the packing space of the part $l$, then the likewise undivided first ring $b$ provided with an annular rib $c$, and so on. Finally comes a jacketing ring $m$ also containing a carbon ring $k$ and forming a lantern or casing and then the aforesaid broad ring $d$ provided with the annular rib $e$, against which the nut $f$ is screwed. The jacketed rings $g$, $h$, $k$ are kept in place by the points $i$ pressed into the wall of the stuffing box casing as by a gland $n$.

It is evident from the upper part of Fig. 1, that the projections $h$ of the jacketing rings $g$ facing the rings $b$ of the shaft $a$ form labyrinths. Hence, even if still a small quantity of superheated steam under maximum pressure passes between the first annular rib $c$ and the first carbon ring $k$, this very fine stream of steam is discharged into a relatively large space formed behind said first rib $c$, whereby a corresponding expansion of the super-heated steam is caused. By the arrangement of a considerable number of such large expansion spaces between the annular ribs and the carbon rings a very complete packing is obtained even at maximum pressure. At the same time it is made possible to essentially shorten the length of the whole packing or of the stuffing box, when compared with that of other labyrinth packings and combined point and surface packings.

According to the modification shown in Fig. 2, both in the rings $b$ applied to the shaft $a$ and in the jacketed rings $g$ threaded holes $p$ and $o$ are provided. These holes are to be seen only in some of said rings $b$ and $g$. When stripping the packing screws may be fastened in the most outward ring $d$, $g$ or $b$, respectively, in order to facilitate the drawing of these rings from the shaft $a$ or out of the casing $l$, respectively. The forward ends of the screws fastened into the holes $p$ and $o$ may bear handles or like arrangements for facilitating the manipulation of said screws.

I claim:

1. A packing for the shafts of rotary machines, turbines and the like, comprising a number of sharpened annular ribs spaced apart on the shaft to be packed, graphite carbon rings fixed opposite to said annular ribs to the unmovable part of the stuffing box, said graphite carbon rings being jacketed by rings of a material having a coefficient of thermal expansion considerably higher than that of said graphite carbon rings, the outer diameter of said graphite carbon rings before being jacketed corresponding with the inner diameter of said jacketing rings when the latter are heated to a high temperature, said graphite carbon rings thus being compressed by their jackets at ordinary temperature and expanding with said jackets upon heating.

2. A packing for the shafts of rotary machines, turbines and the like, comprising a number of sharpened annular ribs spaced apart on the shaft to be packed, graphite carbon rings fixed opposite to said annular ribs to the unmovable part of the stuffing box, said graphite carbon rings being jacketed by rings of a material having a coefficient of thermal expansion considerably higher than that of said graphite carbon rings, said coefficient of thermal expansion being about the same as that of the shaft to be packed, the outer diameter of said graphite carbon rings before being jacketed corresponding with the inner diameter of said jacketing rings when the latter are heated to a high temperature, said graphite carbon rings thus being compressed by their jackets at ordinary temperature and expanding with said jackets upon heating.

3. A packing for the shafts of rotary machines, turbines and the like, comprising a number of sharpened annular ribs spaced apart on the shaft to be packed, graphite carbon rings fixed opposite to said annular ribs to the unmovable part of the stuffing box, said graphite carbon rings being jacketed by rings of a material having a coefficient of thermal expansion considerably higher than that of said graphite carbon rings, the outer diameter of said graphite carbon rings before being jacketed corresponding with the inner diameter of said jacketing rings when the latter are heated to a high temperature, said graphite carbon rings thus being compressed by their jackets at ordinary temperature and expanding with said jackets upon heating, radial annular projections on said jacketing rings, said jacketing rings with their projections thus being of L-shaped cross section, said radial projections being of such radial dimension that a small clearance is left between their inner edges and that part of the shaft which is surrounded by them, a labyrinth thus being formed.

4. A packing for the shafts of rotary machines, turbines and the like, comprising a number of sharpened annular ribs spaced apart on the shaft to be packed, graphite carbon rings fixed opposite to said annular ribs to the unmovable part of the stuffing box, said graphite carbon rings being jacketed by rings of a material having a coefficient of thermal expansion considerably higher than that of said graphite carbon rings, the outer diameter of said graphite carbon rings before being jacketed corresponding with the inner diameter of said jacketing rings when the latter are heated to a high temperature, said graphite carbon rings thus being compressed by their jackets at ordinary temperature and expanding with said jackets upon heating, fine points being arranged the one beside the other on the outside of said jacketing rings, said points serving for fastening said jacketed graphite carbon rings to the inner wall of the stuffing box casing.

GUSTAV HUHN.